B. ROMAN.
VEHICLE INDICATOR.
APPLICATION FILED MAR. 21, 1908.
918,701.
Patented Apr. 20, 1909.
2 SHEETS—SHEET 1.
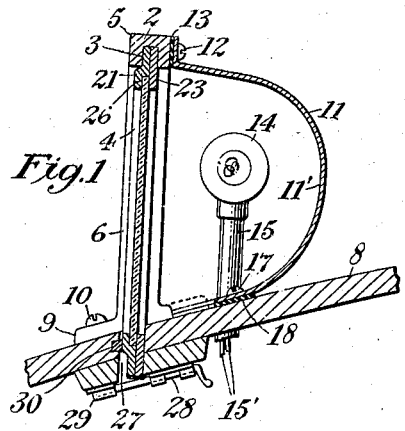
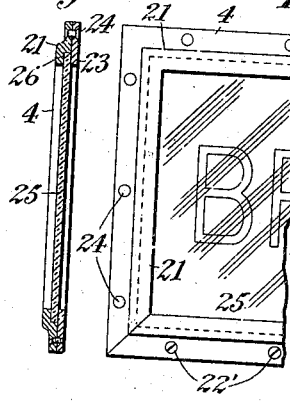
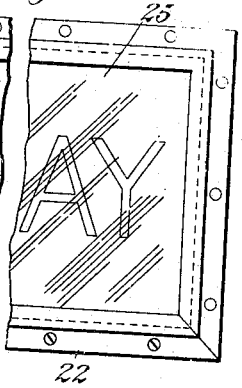
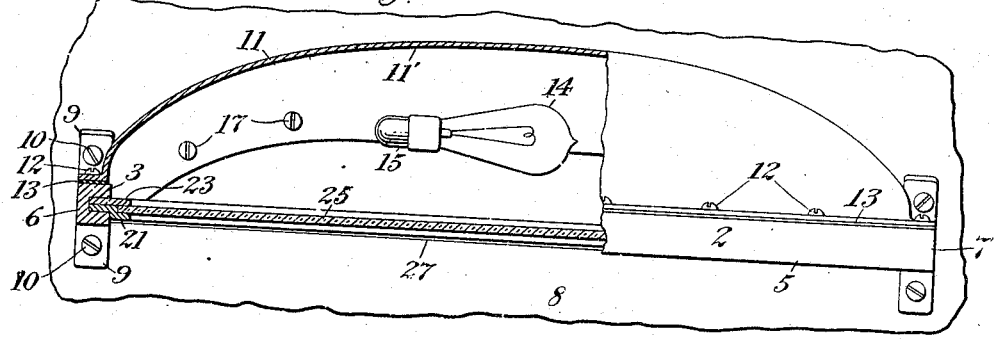
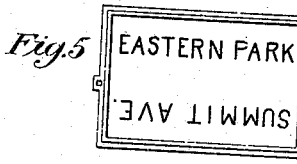
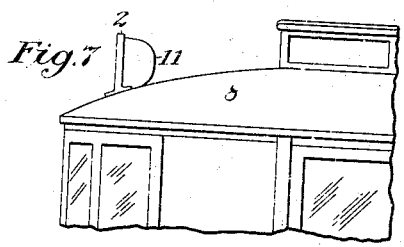
Witnesses:
Clyde J. Coleman
S. B. King
Inventor:
Benjamin Roman
by Charles D. King
Attorney.

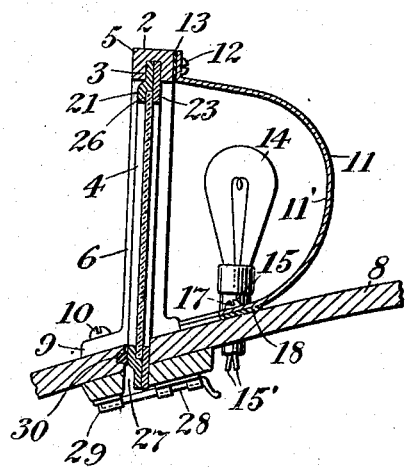

UNITED STATES PATENT OFFICE.

BENJAMIN ROMAN, OF NEW YORK, N. Y.

VEHICLE-INDICATOR.

No. 918,701.   Specification of Letters Patent.   Patented April 20, 1909.

Application filed March 21, 1908. Serial No. 422,412.

*To all whom it may concern:*

Be it known that I, BENJAMIN ROMAN, a resident of New York, in the county of New York and State of New York, have invented certain new and useful Improvements in Vehicle-Indicators, of which the following is a specification.

This invention relates to indicators for vehicles and the like, having inclosed compartments, and more particularly to indicators for route and destination indication for use in passenger cars and coaches.

The principal object of this invention is to provide an indicator in which the changes of indication can be readily and accurately made from the interior of a compartment or room of such a vehicle, especially when the vehicle is in motion.

Another object is to construct a simpler and less expensive device than those commonly in use, and in which many changes of indication can be made at a small expense where the number of vehicles is limited or for any other reason changes of vehicles are frequently desired from one route to another route.

In the drawing forming part of this specification Figure 1 is a transverse-section of an illuminated indicator embodying my invention. Fig. 2 is a plan partly in section. Figs. 3 and 4 are details of my preferred form of transparent sign member. Fig. 5 is a front elevation of a double sign member. Fig. 6 is an end elevation of a plurality of signs joined together for use with the other parts of my invention. Figs. 7 and 8 are respectively side and front elevations of a portion of a car having indicators embodying my invention placed in proper position.
Fig. 9 is a transverse-section of my invention showing a modified position of the lighting means.

Similar characters refer to like parts in all the figures of the drawing.

In the preferred construction here illustrated the indicators are shown mounted on the roof of the car over the end compartments and they can be also mounted on the roof midway of the car when more indicators are desirable.

The indicating member is inserted into the indicator casing through an opening in the roof directly underneath the casing, and suitable lighting means are provided in the casing for illuminating the sign member at night, the case serving to protect the sign and the lighting apparatus from the weather or other sources of injury.

Referring to Figs. 1 and 2 of the drawing,
2 is a frame made of channel-iron of such dimensions that the channel forms convenient ways 3 for the sign-frame 4. The frame 2 consists of the top-bar 5 and sidebars 6 and 7, and is secured on the roof 8 of a car or other vehicle by lugs 9 and screws
10. Fastened to the rear of the frame 2 is a sheet-metal member 11, which has a contour curved both vertically and horizontally, the said curves being blended together in such a way to form a reflector to concentrate the rays of one or more lamps upon the sign member to illuminate the sign. The interior reflecting surface 11' may be highly polished or silvered as desired, to give more efficiency to the rays. The member 11 has also an additional function, which is to serve as a water-tight back for the frame 2 and a shield to protect the light or lights, and it is firmly fastened to the frame by screws 12 with a gasket 13 interposed between it and the frame 2. It could also be secured by solder, or by solder and screws, thus making it integral with the frame, the solder making it water-proof. The contour of the curved portion of the reflecting member is preferably much longer than it is high and its curved surface is farthest from the sign member at the middle, growing shallower at either end. The lamp 14 for lighting the sign at night is shown mounted horizontally on a tubular fixture 15 but it may be mounted vertically if desired, as illustrated in Fig. 9 and would have slightly less efficiency than if placed as shown in Figs. 1 and 2. Feed wires 15' are carried inside the fixture 15 from the interior of the car to the lamp or lamps 14 in the sign-casing 11. The frame 2 and the member 11 thus form a casing for the lamp and sign with a rectangular opening 16 for displaying the sign as clearly seen in Fig 8, the member 11 being secured to the roof of the car at the back by screws 17 and a gasket 18 to render the joint water-tight.

In my preferred construction shown in detail in Figs. 3 and 4, the sign frame 4 is rectangular in outline with a rectangular opening, and is composed of the rabbeted member 21 and the flat member 23, which are fastened together by rivets 24 with a glass plate 25 held between the two in the rabbeted portion 26 of member 21. The rabbeted member 22 is removably fastened to the flat member 23 by screws 22', and is for removing the glass plate 25 when desired. On the glass plate is placed the desired lettering for destination or route indication, but many other types of sign members can be used if desired, and this invention is not limited to any one form. Directly underneath the ways 3 in the frame 2 is a slot 27 through the roof of the car, through which the sign may be passed into its position in the ways 3 to properly display the lettering through the opening 16. A suitable fastening device is used to hold the sign in this position and in my preferred construction, I ordinarily provide a bolt 28 that is pulled back toward the right when the sign is placed in position, and then slid into the socket 29 to secure the sign in the ways 3, but many other ways of retaining the sign in the ways can be used, and I do not limit myself to one particular form. The slot 27 in the roof of the car is provided with a rubber lining 30 to prevent the entrance of rain and snow as well as drafts of air, and the lining is preferably cemented firmly in place, but it may be desirable in some cases to secure it by a mechanical clamping device secured to the roof by screws or other suitable means.

In ordinary practice the operation of changing the route or destination indication is very simple and convenient, and consists in merely withdrawing the bolt 28 out of the socket 29, drawing down the sign member just used, replacing it with one of the destination or route desired and slipping the bolt 28 into the socket 29 again. One or more sign members are required to be ready for use in ordinary practice in addition to the one in the indicator, and a simple rack can be provided in a convenient place for those not in use in the indicator.

The location of the indicator is such that it is at a convenient height for the conductor, driver or motorman to change the signs without leaving the interior of the car or even his regular post, and it is also obvious that the operator must be very blundering to make any mistakes in destination or route indication with this device.

The sign members may have only one destination or route indication, or may have two indications as illustrated in Fig. 5, where the indication for use is at the top and the one not then in use is inverted and when the sign is placed in the ways is hidden from sight by the roof and other parts of the car. In Fig. 6 I have illustrated a method of joining several signs together but having only one sign 32 in use, and held in the ways 3, while the others 33, 34, 35 hang down below ready to be put in the ways if required. The sign members in Figs. 5 and 6 are intended to be secured in position by the bolt 28 placed at the end in the form shown in Fig. 5 and in the center if desired, with the form shown in Fig. 6.

My invention can be used without a special light therefor if desired, by placing the ways 3 contiguous to the monitor of the roof of the car so that the light from the interior of the car may shine through the sign when placed in the ways. This method gives a more economical operation but less efficient than where the special lamp, or lamps and reflector are used. This invention can also be used for car or train signals where colored disks or other symbols are used to indicate the destination or route of the car or train, said disks or other symbols being placed on the sign member 25.

It is obvious that many modifications of this invention can be constructed and I do not limit myself to one particular form except as defined by the scope of the appended claims.

I claim as my invention—

1. A device of the class described, embodying a frame having sign-holding ways and a sign-displaying aperture and projecting outside of a compartment, a sign adapted to be passed into said ways at one edge of the frame from the interior of said compartment and to be held in said ways, and a compartment wall having an opening registering with said ways.

2. A device of the class described, embodying a frame having sign-holding ways and a sign-displaying aperture and projecting outside of a compartment, a sign adapted to be passed into said ways at one edge of the frame from the interior of said compartment, a compartment wall having an opening registering with said ways, and means for retaining said sign in position in said ways.

3. A device of the class described, embodying a casing projecting outside of a compartment and having a sign-displaying aperture and sign-holding means, a sign adapted to be passed into said sign-holding means at one edge of the same from the interior of said compartment and held in said means, and a compartment wall having an opening registering with said sign-holding means.

4. A device of the class described, embodying a casing projecting outside of a compartment and having a sign-displaying aperture and sign-holding ways, a sign adapted to be passed into said ways at one edge of the same from the interior of said compartment and held in said ways, and a compartment wall having an opening registering with said sign-holding ways.

5. In combination with a passenger vehicle, an indicator embodying a casing having a sign-displaying aperture and sign-holding ways and which is mounted on the roof of the vehicle, a vehicle-roof having a suitable slot in line with said ways, a suitable sign movable into and out of place through said slot, and means for retaining the sign in said ways.

6. In combination with a passenger vehicle, an indicator embodying a casing having a sign-displaying aperture and sign-holding ways and which is mounted on the roof of the vehicle, a suitable sign, means for retaining said sign in said ways, a vehicle-roof having a slot in line with said ways, and means to render said slot water-tight with the sign in position in said ways.

7. In combination with a passenger vehicle, an indicator comprising a casing having a sign-displaying aperture and sign-holding ways and which is mounted on the roof of the vehicle, a sign having suitable indications thereon, means for retaining the sign in said ways, a vehicle-roof having a slot in line with said ways, and means inside the casing for lighting the said sign.

8. An indicator of the class described, comprising a sign, sign-holding means adapted to have said sign passed therein at the lower end of said sign-holding means, and means for maintaining said sign in said sign-holding means.

9. In combination with a passenger vehicle, a destination indicator embodying a casing having a sign-displaying aperture, sign-holding ways and a reflector, said casing being mounted on the roof of said vehicle, a sign, means for retaining said sign in said ways, a vehicle-roof having a slot in line with said ways, and one or more electric lamps placed in proper relation to said sign and said reflector.

10. In combination with a passenger vehicle, a destination indicator embodying a casing having a sign-displaying aperture, sign-holding ways and a concave reflector that is longer than it is high, said casing being mounted on the roof of said vehicle, a sign, a vehicle-roof having a slot in line with said ways, means for supporting the lower end of the sign, and one or more electric lamps placed in said casing in proper relation to the sign and the reflector.

11. A device of the class described, comprising sign-holding means projecting outside of an apartment, an apartment wall having a suitable opening, a sign movable into and out of place in said sign-holding means through said opening, and means for maintaining said sign in said sign-holding means.

12. A device of the class described, comprising sign-holding ways projecting outside of an apartment, an apartment wall having an opening registering with said ways, and a sign adapted to be passed into said ways through said opening from the interior of said apartment, and to be held in said ways.

13. A device of the class described, comprising sign-holding ways projecting outside of an apartment, an apartment wall having an opening registering with said ways, a sign movable into and out of place in said ways through said opening from the interior of said apartment, and means at the lower end of said sign for positively locking said sign in said ways.

14. In combination with a passenger vehicle having an inclosed compartment, sign-holding ways projecting outside of said compartment, a compartment wall having an opening registering with said ways, a sign adapted to be moved into and out of place in said ways through said opening from the interior of said compartment, and means for maintaining said sign in said ways.

Signed at New York, in the county of New York, and State of New York, this 17th day of March, A. D. 1908.

BENJAMIN ROMAN.

Witnesses:
CHARLES D. KING,
HENRI A. L. HOSNET.